J. B. COUSIN.
FOOD RECEPTACLE FOR BIRD CAGES.
APPLICATION FILED JULY 28, 1910.

992,167.

Patented May 16, 1911.

Witnesses
W. E. Smith
B. G. Richards

Inventor
Joseph B. Cousin
by Joshua R. H. Potts
his Attorney

UNITED STATES PATENT OFFICE.

JOSEPH B. COUSIN, OF CHICAGO, ILLINOIS.

FOOD-RECEPTACLE FOR BIRD-CAGES.

992,167. Specification of Letters Patent. Patented May 16, 1911.

Application filed July 28, 1910. Serial No. 574,338.

*To all whom it may concern:*

Be it known that I, JOSEPH B. COUSIN, a citizen of the United States, residing at Chicago, county of Cook, and State of Illinois, have invented certain new and useful Improvements in Food-Receptacles for Bird-Cages, of which the following is a specification.

My invention relates to improvements in food receptacles for bird cages and especially to receptacles for the retention of crackers therein.

The object of the invention is to provide a simple and convenient device for holding bird food, such as a cracker, in a bird cage, which shall be of simple construction and efficient in operation.

The invention consists in the combination and arrangement of parts hereinafter described and claimed.

Figure 1:
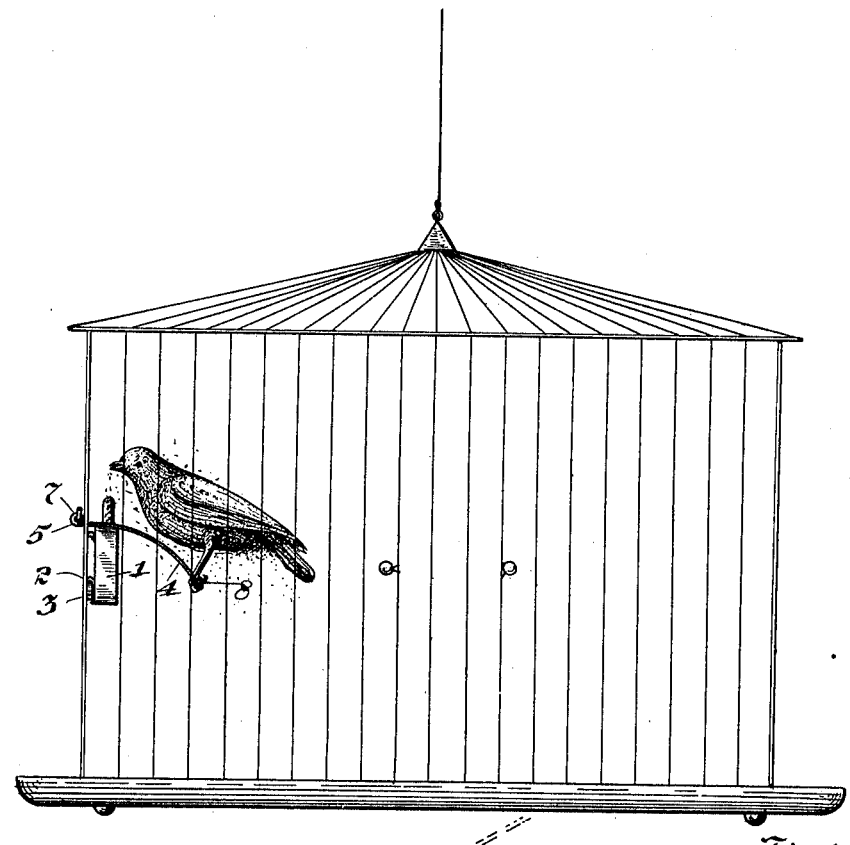
Figure 2:
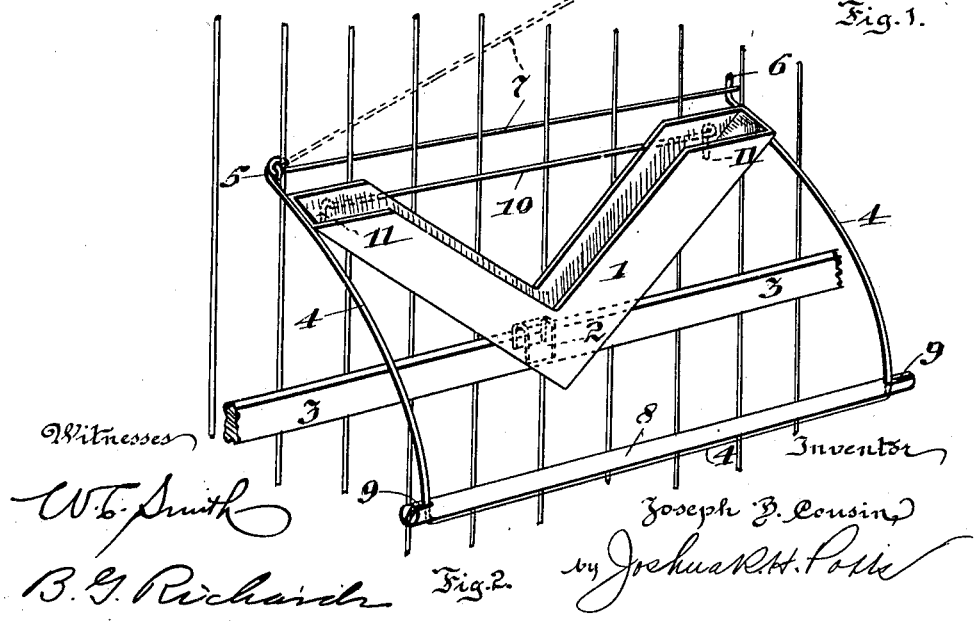

The invention will be best understood by reference to the accompanying drawing forming a part of this specification, and in which, Figure 1 is a side elevation of a bird cage equipped with a cracker receptacle embodying my invention, and Fig. 2 is a detail perspective view of the receptacle.

The preferred form of construction as illustrated in the drawing comprises a V-shaped channel member 1 adapted to receive and support a cracker. Member 1 is provided at its bottom with a hook member 2 adapted to take over the side bar 3 of a bird cage. A downwardly and inwardly extending U-shaped wire member 4 has its ends secured to the upper portions of member 1 and extended somewhat beyond said member 1, one of said ends being formed into an eye 5 and the other into a hook 6. A locking bar 7 is hinged to eye 5 and adapted to engage hook 6 as shown. A cylindrical wooden rod 8 is secured in loop 4 by inserting the sides thereof in the notches 9 in the ends of said rod.

In use the receptacle is secured in position by placing hook 2 over the side bar 3 of the cage with eye 5 and hook 6 projecting outwardly through the wires of the cage. Then bar 7 is secured in engagement with hook 6, thus securely locking the receptacle in position. A cracker is set edgewise in the channel member 1 and rod 8 furnishes a convenient perch for the bird.

To provide for cages in which the side bar 3 is higher than that shown, I secure a wire rod 10 across the upper portion of member 1 and turn the ends of the same outwardly and downwardly to form hooks 11 adapted to engage such a bar.

While I have illustrated and described the preferred form of construction for carrying my invention into effect this is capable of variation or modification without departing from the spirit of the invention. I therefore do not wish to be limited to the exact details set forth but desire to avail myself of such variations and modifications as come within the scope of the appended claims.

Having described my invention what I claim as new and desire to secure by Letters Patent is:

1. A device of the class described comprising a food receptacle consisting of a V-shaped channel member; means for attaching said receptacle to the side of a bird cage; and a perch carried by said receptacle, substantially as described.

2. A device of the class described comprising a food receptacle consisting of a V-shaped channel member; a hook on said member adapted to engage a side bar of a bird cage; an eye projecting from one side of said member; a hook projecting from the other side of said member; a locking bar hinged to said eye and adapted to engage said last mentioned hook; and a perch carried by said receptacle, substantially as described.

3. A device of the class described comprising a food receptacle consisting of a V-shaped channel member; a hook on said member adapted to engage a side bar of a bird cage; a downwardly and inwardly extending U-shaped wire loop member having its ends secured to the upper portions of said receptacle, said ends being extended and one formed into an eye and the other into a hook; and a locking bar hinged to said eye and adapted to engage said last mentioned hook, substantially as described.

In testimony whereof I have signed my name to this specification in the presence of two subscribing witnesses.

JOSEPH B. COUSIN.

Witnesses:
HELEN F. LILLIS,
JOSHUA R. H. POTTS.

Copies of this patent may be obtained for five cents each, by addressing the "Commissioner of Patents, Washington, D. C."